Jan. 1, 1929.
C. A. BORNMANN
1,697,492
SAFETY GUARD FOR SHUTTERS
Filed Oct. 1, 1927
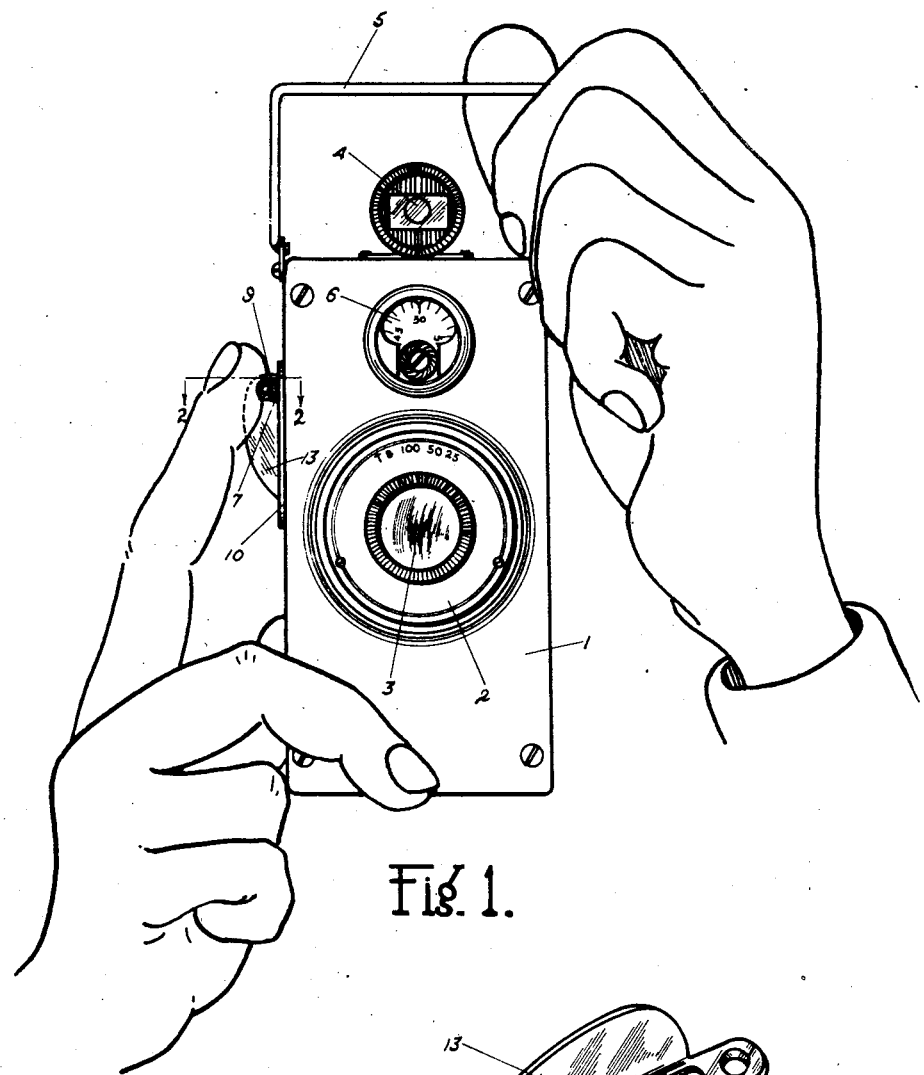
Fig. 1.
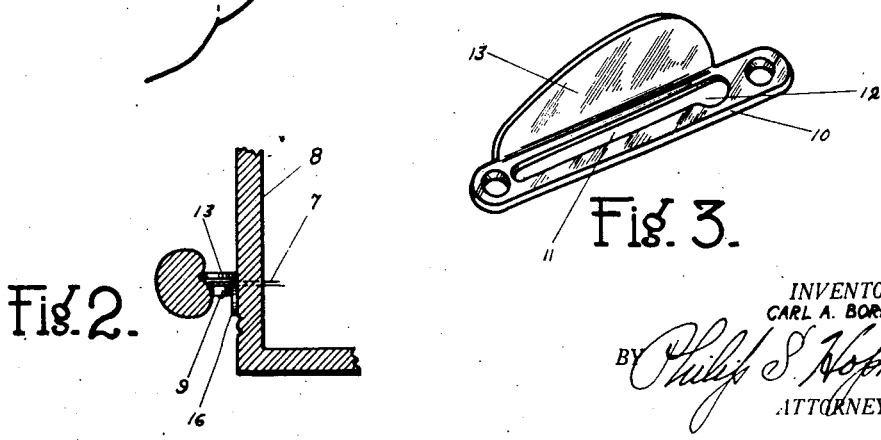
INVENTOR.
CARL A. BORNMANN.
BY
ATTORNEYS.

Patented Jan. 1, 1929.

UNITED STATES PATENT OFFICE.

CARL A. BORNMANN, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK.

SAFETY GUARD FOR SHUTTERS.

Application filed October 1, 1927. Serial No. 223,392.

My invention has reference to photographic cameras and particularly to a means for preventing the accidental snapping of the camera shutter.

As is well known, the shutter operating lever of photographic cameras, particularly of the box type as distinguished from the folding camera, projects outwardly through one side wall of the camera for ease of manipulation by the operator. As a result it sometimes occurs that if the camera is brushed against an object inadvertently, or, more often, when the camera is withdrawn from its casing, this shutter lever is accidentally moved or operated to snap the shutter, thus spoiling the section of film in position for exposure at that time. This is not only wasteful of film but unless the operator knows at the time of such accidental snapping of the shutter, he will fail to move such spoiled section of film out of the exposure station and will in all likelihood make his next exposure on such accidentally exposed section.

In order to overcome this evil, I have provided a novel guard for the shutter lever which effectively protects such lever against accidental manipulation but which in no way interferes with the operation thereof when and as desired by the camera user.

The primary object of my invention therefore is to provide a guard for the shutter lever of a camera to eliminate the accidental operation thereof.

Another object is to provide such a guard which is simple and inexpensive in construction and which in no way interferes with the ordinary operation of the shutter lever.

Other objects and advantages in details of construction and operation will be apparent as the description proceeds, reference now being had to the figures of the accompanying drawing wherein like reference numerals indicate like parts.

In the drawing:—

Figure 1 is a front view of a camera illustrating the operation and usefulness of my improved shutter lever guard.

Figure 2 is a detail cross sectional view taken on the line 2—2 of Figure 1.

Figure 3 is a detail perspective view of the shutter guard.

By the reference numeral 1, I have indicated a camera provided with the usual shutter 2, lens 3, view finder 4, and handle 5. An exposure counter is indicated at 6.

The shutter lever 7 extends through the side wall 8 of the camera and is provided on its projecting end with the finger piece 9.

Also secured to the side wall 8 of the camera is a plate 10 slotted as at 11 to permit the movement of the shutter lever for operating the shutter. The upper end of the slot 11 is enlarged as at 12 to permit the passage of the finger piece 9 therethrough when the plate 10 is secured in position on the side wall of the camera.

Along one edge of the plate 10 directly adjacent the slot 11, I have provided an outstanding flange guard 13, projecting as shown in Figure 1, beyond the end of the shutter lever. The edge of the guard 13 is preferably smoothed and bevelled downwardly so as not to injure the finger of the operator coming in contact therewith.

Obviously with the guard 13 closely adjacent to the shutter lever and projecting beyond the same, there is little likelihood of the accidental movement of the shutter lever due to careless brushing of the same against an object, or in pulling the camera from its case. However as shown clearly in Figures 1 and 2, the operator may readily move the shutter lever to make an exposure by pressing his finger against the guide, the finger being flexible enough to engage the shutter lever, or by engaging the shutter lever from the front alongside the guard.

Of course, many changes may be made in details of construction and arrangement of parts such as for instance, making the guard 13 operate from the plate 10, without departing from the spirit and scope of my invention. I do not limit myself therefore to the exact structure shown and described other than by the appended claims.

I claim:—

1. In combination, a camera having a shutter and shutter lever, and a fixed guard for said lever.

2. In combination, a camera having a shutter and shutter lever, and a fixed guard for said lever projecting beyond the free end thereof.

3. In combination, a camera having a shutter and a projecting shutter lever, and a fixed rigid guard on said camera directly adjacent said lever and projecting beyond the free end thereof.

4. In combination, a camera having a shutter and a projecting shutter lever, a slotted plate through which said lever projects, and a fixed guard adjacent said lever and projecting beyond the free end thereof.

5. In combination, a camera having a shutter and a projecting shutter lever, a slotted plate through which said lever projects, said plate having a flange adjacent said lever and projecting beyond the free end thereof.

6. In combination, a camera having a shutter and a projecting shutter lever, a slotted plate through which said lever projects, one edge of said plate adjacent said lever having an integral outstanding guide flange projecting beyond the free end of said lever.

CARL A. BORNMANN.